US012621914B2

(12) United States Patent
Kim

(10) Patent No.: US 12,621,914 B2
(45) Date of Patent: May 5, 2026

(54) LAMP SYSTEM

(71) Applicant: HYUNDAI MOBIS CO., LTD., Seoul (KR)

(72) Inventor: Myeong Je Kim, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 112 days.

(21) Appl. No.: 18/545,369

(22) Filed: Dec. 19, 2023

(65) Prior Publication Data

US 2024/0365453 A1 Oct. 31, 2024

(30) Foreign Application Priority Data

Apr. 27, 2023 (KR) ........................ 10-2023-0055353

(51) Int. Cl.
*H05B 45/14* (2020.01)
*H05B 45/18* (2020.01)
*H05B 45/46* (2020.01)

(52) U.S. Cl.
CPC ............. *H05B 45/46* (2020.01); *H05B 45/14* (2020.01); *H05B 45/18* (2020.01)

(58) Field of Classification Search
CPC ........ H05B 45/14; H05B 45/18; H05B 45/46; H05B 45/52; H05B 45/56; H05B 45/345; H05B 45/347; H05B 45/3725; B60Q 1/0094; B60Q 1/34; B60Q 1/44; B60Q 1/56; B60Q 1/305; B60Q 1/2661
See application file for complete search history.

(56) References Cited

U.S. PATENT DOCUMENTS

| | | | | | |
|---|---|---|---|---|---|
| 5,736,881 | A * | 4/1998 | Ortiz | H01S 5/042 327/515 |
| 7,884,558 | B2 * | 2/2011 | Steele | H05B 45/20 315/307 |
| 8,610,360 | B2 * | 12/2013 | Hsu | H05B 45/37 315/192 |
| 11,032,889 | B2 * | 6/2021 | Zojceski | H10H 29/142 |
| 2003/0025120 | A1 * | 2/2003 | Chang | H05B 45/46 257/82 |
| 2015/0053163 | A1 * | 2/2015 | Bolz | F02P 23/04 372/38.03 |
| 2018/0054862 | A1 * | 2/2018 | Takagimoto | B60Q 1/34 |
| 2020/0086781 | A1 * | 3/2020 | González Juanes | G07C 5/0808 |
| 2020/0253010 | A1 * | 8/2020 | Pampattiwar | H05B 45/44 |

FOREIGN PATENT DOCUMENTS

KR 10-2018-0136799 A 12/2018

* cited by examiner

*Primary Examiner* — Tung X Le
(74) *Attorney, Agent, or Firm* — NSIP Law

(57) ABSTRACT

A lamp system is provided. The lamp system includes: a light source driver module to provide driving power, a light source array module including a light source, among light sources, connected in parallel with the driving power, a switch connected in series with the light source to control an operation of the light source; and a processor to control the switch, control the light source driver module to provide the driving power, and control the driving power based on a voltage across at least some of the light sources.

15 Claims, 8 Drawing Sheets

FIG. 4

[ALL FORWARD VOLTAGES]

| PIXEL ID | Forward Voltage (V) | PIXEL ID | Forward Voltage (V) |
|---|---|---|---|
| 1 | 3.0 | 19994 | 3.1 |
| 2 | 3.1 | 19995 | 3.2 |
| 3 | 3.2 | 19996 | 3.1 |
| 4 | 3.1 | 19997 | 3.0 |
| 5 | 3.0 | 19998 | 3.1 |
| 6 | 3.0 | 19999 | 3.2 |
| ..... | | 20000 | 3.2 |

[REPRESENTATIVE FORWARD VOLTAGE]

Max forward voltage

| PIXEL ID | Forward Voltage (V) | PIXEL ID | Forward Voltage (V) |
|---|---|---|---|
| 1 | 3.0 | 10002 | 3.4 |
| 100 | 3.1 | 12010 | 3.2 |
| 351 | 3.2 | 15321 | 3.1 |
| 1000 | 3.1 | 17332 | 3.0 |
| 5000 | 3.0 | 19927 | 3.1 |

LAMP SYSTEM

CROSS-REFERENCE TO RELATED APPLICATION(S)

This application claims the benefit under 35 U.S.C. § 119 to Korean Patent Application No. 10-2023-0055353, filed on Apr. 27, 2023, in the Korean Intellectual Property Office, the disclosure of which is incorporated by reference for all purposes.

BACKGROUND

1. Field

The present disclosure relates to a lamp system, and more particularly, to a lamp system that may efficiently supply driving power to a light source.

2. Description of Related Art

In the recent development of an automobile headlamp, the development of an intelligent headlamp with a large emphasis on safety has been actively progressing around the world, and the automobile headlamp has evolved along with the development of lighting technology using electricity. New types of light sources such as a sealed beam lamp utilizing a headlamp like a single filament bulb, a halogen lamp using a halogen gas, and a high-intensity discharge (HID) lamp using a high voltage discharge method have emerged one after another. A light emitting diode (LED) lamp using light emitting diodes has been spotlighted after the 21st century.

Accordingly, a high-resolution LED market is gradually expanding, and an application for road image projection of a high-resolution LED is gradually expanding. Meanwhile, as shown in FIG. 1, many LEDs may be mounted on a narrow substrate in a conventional high-resolution LED lamp system. In addition, these LEDs may be driven by the same power supply, and LED driving power may be supplied based on the largest forward voltage in consideration of a deviation in forward voltage drops of the respective LEDs.

However, when supplying the driving power in this way, in a node having a small LED forward voltage drop, a high voltage may be applied to a switch (e.g., a field-effect transistor (FET)) terminal of the LED driving power, which may be dissipated as heat. Therefore, the lamp may have lower efficiency due to heat occurrence.

Related art includes Korean Patent Publication No. 10-2018-0136799 entitled "CURRENT CONTROL SYSTEM FOR LEDS" and published on Dec. 26, 2018.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect of the disclosure, a lamp system includes: a light source driver module to provide driving power; a light source array module including a light source, among light sources, connected in parallel with the driving power; a switch connected in series with the light source to control an operation of the light source; and a processor to control the switch, control the light source driver module to provide the driving power, and control the driving power based on a voltage across at least some of the light sources.

The processor may further: measure the voltage across the light sources; and control the driving power by including a predetermined margin value in a maximum value among the measured voltages across the light sources.

The processor may: list up initially-measured voltages across the light sources in descending order; select a predetermined number of light sources having a highest voltage across the light sources; and extract the maximum value of the selected light sources.

The processor may monitor each of the voltages across the light sources at a predetermined period to update the predetermined number of light sources having the highest voltage across the light sources.

The processor may: generate a control table for the increase and decrease of the maximum value; and control each driving power to be different for the increase or decrease of a current maximum value compared to a previous maximum value based on the control table.

The processor may: set a first section which is a predetermined voltage section; maintain the driving power to have a constant value when the maximum value is included in the first section; and apply hysteresis to each section when the maximum value is included in a section before or after the first section to control the driving power to have different predetermined maximum values when a current maximum value is increased or decreased compared to a previous maximum value.

The processor may: monitor a temperature of the light source having the maximum value among the voltages across the light sources, while predicting a voltage change based on the temperature; and control the driving power based on the voltage change.

The processor may: calculate the voltage across the switch based on the measured voltage across the light sources, while causing an interruption when any one of the measured voltages is outside a preset range; and control the driving power based on the interruption.

The processor may: control the driving power to be increased by causing the interruption exceeding a lower limit when any one of the measured voltages is outside the lower limit of the preset range; and control the driving power to be decreased by causing the interruption exceeding an upper limit when any one of the measured voltages is outside the upper limit of the preset range.

The light source array module may include a light emitting diode (LED) array module (LAM).

The light source driver module may include a light emitting diode (LED) driver module (LDM).

The processor may measure the voltage across the light sources in real time.

The processor may periodically monitor the predetermined number of light sources having the highest voltage across the light sources, and the light sources may include light-emitting diodes (LEDs).

In another aspect of the disclosure, a processor-implemented method for controlling a lamp system, includes: providing driving power; providing a light source, among a plurality of light sources, connected in parallel with the driving power; providing a switch connected in series with the light source to control the light source; controlling the switch; controlling a light source driver module to provide the driving power; and controlling the driving power based on a voltage across at least some of the plurality of light sources.

BRIEF DESCRIPTION OF THE DRAWINGS

FIG. 4 is a table showing a forward voltage of a light emitting diode (LED) according to another embodiment of the present disclosure.

DETAILED DESCRIPTION

In order to describe the present disclosure, operational advantages of the present disclosure, and objects accomplished by embodiments of the present disclosure, the embodiments of the present disclosure are hereinafter exemplified and described with reference to the accompanying drawings.

First, terms used in this application are used only to describe specific embodiments rather than limiting the present disclosure, and a term of a singular number may include its plural number unless explicitly indicated otherwise in the context. In addition, it is to be understood that a term "include," "have," or the like used in this application specifies the existence of features, numerals, steps, operations, components, parts, or combinations thereof, which are mentioned in the specification, and does not preclude the existence or addition of one or more other features, numerals, steps, operations, components, parts, or combinations thereof.

When it is decided that the detailed description of the known configuration or function related to the present disclosure may obscure the gist of the present disclosure, the detailed description thereof will be omitted.

Figure 1:
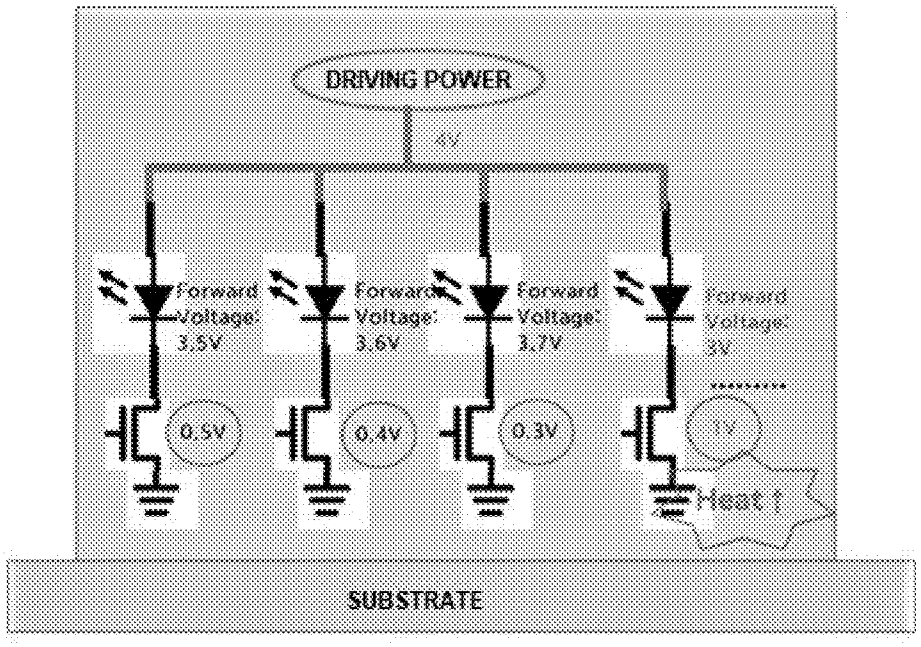
FIG. 1 is a schematic view showing a conventional lamp system.
Figure 2:
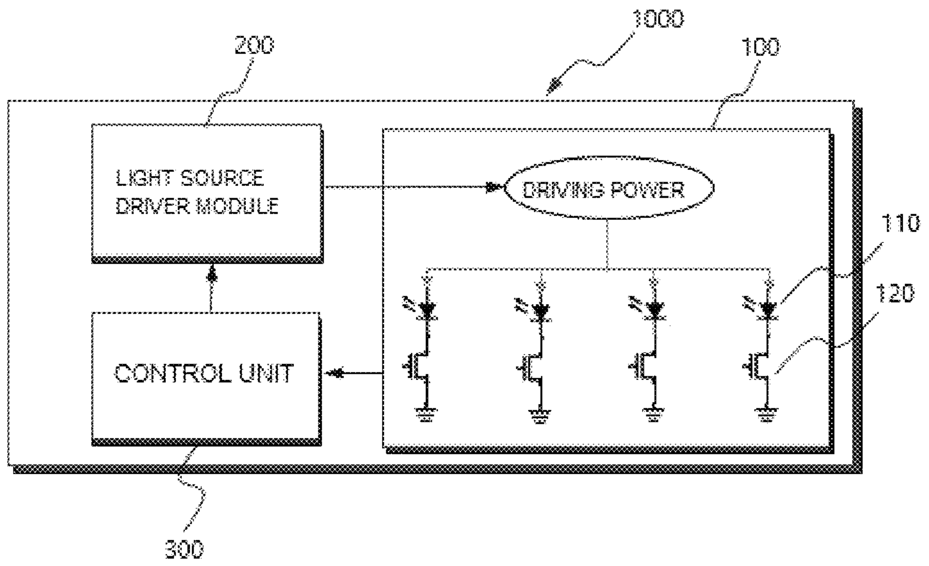
FIG. 2 is a schematic view showing a lamp system according to the present disclosure.

FIG. 2 is a schematic view showing a lamp system according to the present disclosure.

As shown in FIG. 2, a lamp system 1000 positioned in a moving object according to the present disclosure may include a light source array module 100, a light source driver module 200, and a control unit 300 (e.g., a processor).

The light source driver module 200 may provide driving power.

The light source array module 100 may include at least one light source 110 and at least one switch 120.

In detail, at least one light source 110 may be connected in parallel with the driving power, and the at least one switch 120 may be connected in series with each of the light sources 110 to control an operation of the light source 110.

The control unit 300 may control the switch 120 and the driving power.

In detail, the control unit 300 may measure a voltage across at least some of the plurality of light sources 110 in real time.

In addition, the control unit 300 may control the driving power based on the measured voltage across the light sources.

Here, for example, the light source array module 100 may be an LED array module (LAM), and the light source driver module 200 may be an LED driver module (LDM).

Accordingly, each of the LED 110 and the FET 120, described below in detail, is an embodiment generally used as each of the light source 110 and the switch 120. This configuration is provided only for more detailed description, and the present disclosure is not limited thereto.

In addition, according to the above embodiment, the voltage across the light sources is expressed as a forward voltage.

Hereinafter, the description describes various embodiments of the lamp system 1000 according to various embodiments of the present disclosure with reference to FIGS. 3 to 8.

Figure 3:
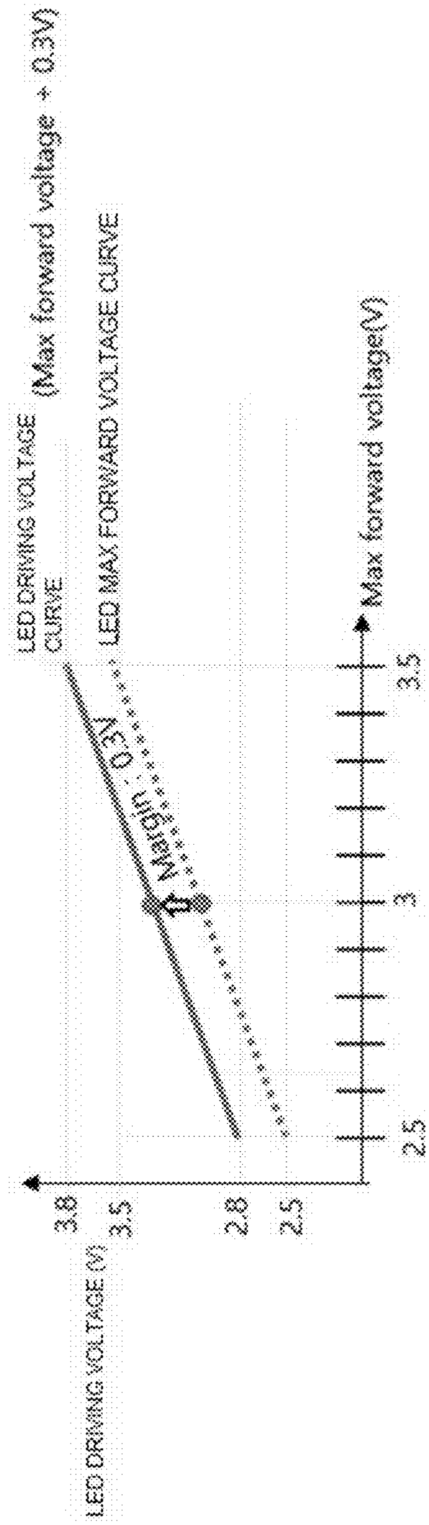
FIG. 3 is a graph showing driving power based on the max forward voltage according to another embodiment of the present disclosure.

FIG. 3 is a graph showing the driving power based on the max forward voltage according to another embodiment of the present disclosure.

When measuring a voltage of at least one LED 110, the control unit 300 may measure a forward voltage.

In detail, the control unit 300 may measure the forward voltage of each of the plurality of LEDs 110 and extract only the maximum value.

The control unit 300 may then set the driving power including a predetermined margin value based on the extracted maximum value.

For example, as shown in FIG. 3, the control unit 300 may supply the voltage by adding a margin of 0.3V to the maximum value (or the LED max forward voltage) rather than supplying the maximum value (LED max forward voltage) as it is.

Meanwhile, the control unit 300 may be required to check information on the forward voltage of each pixel when providing only the forward voltage of each LED. In addition, it may take a considerable amount of time for the control unit 300 to read and monitor the forward voltages of each of approximately 20,000 pixels. Accordingly, it is impossible for the control unit 300 to perform the control in real time.

FIG. 4 is a table showing the forward voltage of the light emitting diode (LED) according to another embodiment of the present disclosure.

As shown in FIG. 4, in the present disclosure the control unit 300 may measure initial forward voltages of all the LEDs 110, and then list up all the forward voltages in descending order. The control unit 300 may then select only the upper predetermined number of LEDs 110 having the highest value, and periodically monitor the same to extract the maximum value, which is the max forward voltage.

Here, the control unit 300 may measure the forward voltages of all the LEDs 110 at a predetermined period. Accordingly, the selected upper predetermined number of LEDs 110 may be changed.

Figure 5:
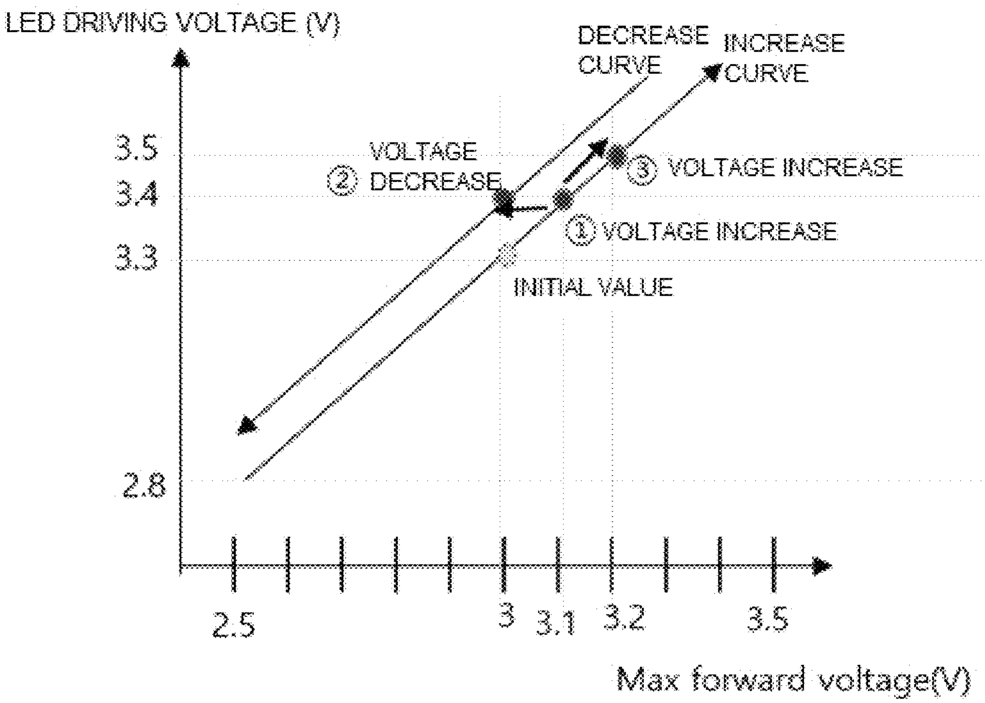
FIG. 5 is a control graph of a control unit according to another embodiment of the present disclosure.

FIG. 5 is a control graph of the control unit according to another embodiment of the present disclosure.

The control unit 300 may control the plurality of LEDs 110 (which may be approximately 20,000 or more) based on the extracted maximum value. In addition, as the LED 110 having the maximum value is changed at the predetermined period, the driving power set by the control unit 300 may be frequently changed.

Accordingly, the entire system may become unstable when the driving power of the plurality of LEDs 110 is frequently changed.

Therefore, the control unit 300 of the lamp system 1000 according to the present disclosure may generate a control table for the increase and decrease of the maximum value of the forward voltage of the plurality of LEDs 110.

In addition, the control unit 300 may set each driving power to be different for the increase and decrease of a current maximum value compared to a previous maximum value based on the generated control table.

In detail, the control unit 300 may set the driving power by reflecting the increase in the maximum value when the maximum value received at a second time is increased compared to the maximum value received at a first time.

For example, as shown in FIG. 5, 3.1 V may be the maximum value received at the first time, and 3.2 V may be the maximum value received at the second time. In this case, the control unit 300 may increase the driving power from 3.4 V to 3.5 V based on an increase curve of the control table.

Meanwhile, 3.1 V may be the maximum value received at the first time, and 3 V may be the maximum value received at the second time. In this case, the control unit 300 may maintain the driving power at 3.4 V based on a decrease curve of the control table.

Accordingly, the driving power may be increased by 0.1 V when the maximum value is increased, whereas there is no change in the driving power when the maximum value is decreased.

In this way, the control unit 300 may minimize fluctuations in the driving power by individually controlling the increase and decrease of the maximum value, thereby making the lamp system 1000 according to the present disclosure more stable.

Figure 6:
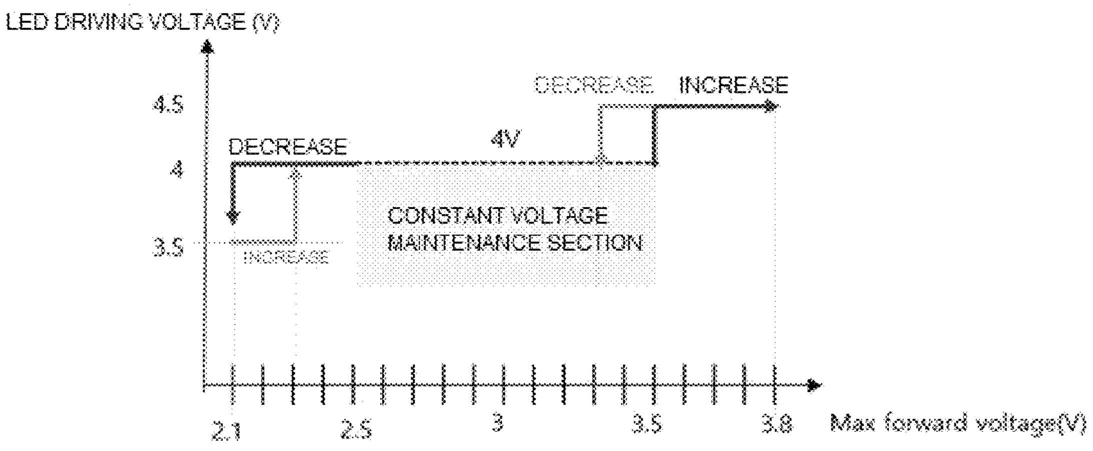
FIG. 6 is a control graph of the control unit according to another embodiment of the present disclosure.

FIG. 6 is a control graph of the control unit according to another embodiment of the present disclosure.

As shown in FIG. 6, the control unit 300 may set a first section which is a predetermined section of the maximum value.

Here, the control unit 300 may maintain the driving power to have a constant value when the received maximum value is included in a range of the first section.

In addition, the control unit 300 may apply hysteresis to a section before or after the first section, and change the driving power to have different predetermined maximum values when the current maximum value is increased or decreased compared to the previous maximum value.

In detail, the maximum value may follow an increase graph shown in the drawing if the value falls before the first section and the second maximum value is greater than the first maximum value when the maximum values extracted in chronological order is referred to as a first maximum value and a second maximum value in order. Accordingly, a constant driving power of 3.5 V may be provided for each of the LEDs when 2.1 V is the first maximum value and 2.2 V is the second maximum value. However, the driving power may be increased to 4 V based on the increase graph when 2.3 V is the second maximum value. In addition, the driving power may be maintained at 4 V when the maximum value received thereafter is a third maximum value and the corresponding value is 2.4 V.

On the other hand, the maximum value may follow a decrease graph shown in the drawing if the value falls before the first section and the second maximum value is smaller than the first maximum value in the first maximum value and the second maximum value extracted in the chronological order. Accordingly, a constant driving power of 4 V may be provided for each of the LEDs when 2.3 V is the first maximum value and 2.2 V is the second maximum value. However, the driving power may be decreased to 3.5 V based on the decrease graph when 2.1 V is the second maximum value.

In addition, the maximum value may follow the increase graph shown in the drawing if the value falls after the first section and the second maximum value is greater than the first maximum value in the first maximum value and the second maximum value extracted in the chronological order. Accordingly, the driving power may maintain a constant value of 4 V before 3.5 V, which is an upper limit of the first section, may be increased from 4 V to 4.5 V, and may then maintain a constant value of 4.5 V for the maximum value thereafter.

On the other hand, the maximum value may follow the decrease graph shown in the drawing if the value falls after the first section and the second maximum value is smaller than the first maximum value in the first maximum value and the second maximum value extracted in the chronological order. Accordingly, up to a certain maximum value in the first section, the value may be maintained to be greater than the driving power of the first section, and the driving power may be decreased to be maintained as a set driving power of the first section when the maximum value received thereafter falls to a certain value or below of the first section.

Through the methods described above, the control unit 300 may extract the max forward voltage among the plurality of forward voltages of the LEDs 110 at predetermined period intervals, and control the driving power of 300 based thereon, thereby changing the driving power to include the predetermined margin compared to the extracted maximum value.

In this way, the minimum driving power may be output to minimize power consumed as heat in the lamp system 1000, thereby increasing efficiency.

Figure 7:
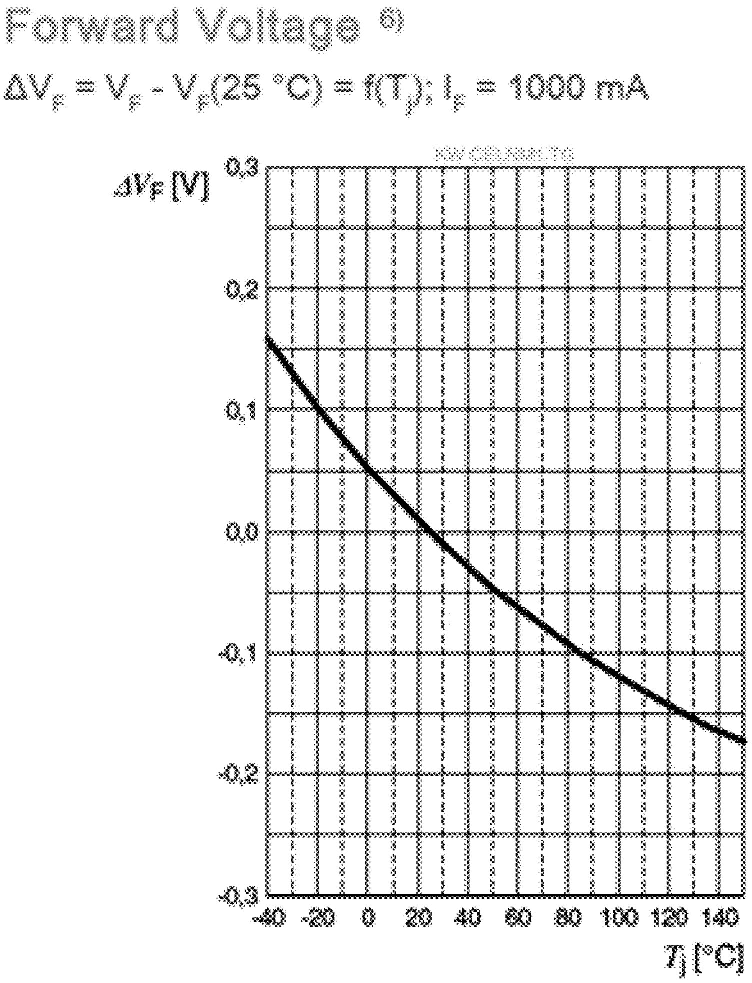
FIG. 7 is an LED feature graph based on a temperature according to another embodiment of the present disclosure.

FIG. 7 is an LED feature graph based on a temperature according to another embodiment of the present disclosure.

As shown in FIG. 7, in general, as the temperature of the LED 110 is increased, the forward voltage may be decreased. On the other hand, as the temperature of the LED 110 is decreased, the forward voltage may be increased.

Therefore, the control unit 300 may monitor the temperature of the LED 110 based on the LED 110 having the maximum value among the forward voltages of the plurality of LEDs 110, and predict a voltage change based thereon.

Accordingly, the control unit 300 may set the driving power based on the predicted voltage change.

Figure 8:
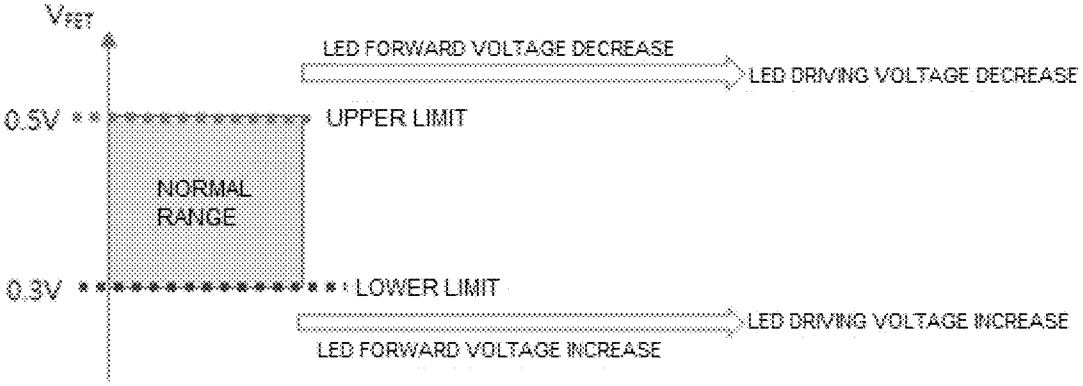
FIG. 8 is a schematic view showing an LED driving power control method according to another embodiment of the present disclosure.

Meanwhile, FIG. 8 is a schematic view showing an LED driving power control method according to another embodiment of the present disclosure.

Before providing the description with reference to FIG. 8, the control unit 300 of the lamp system 1000 according to the present disclosure may calculate each voltage across the FETs 120.

In detail, the control unit 300 may calculate the voltage across the plurality of FETs 120 by the remainder after subtracting the forward voltage from the driving power.

Here, the control unit 300 may preset a predetermined range of the voltage across the FETs 120. Accordingly, the control unit 300 may cause an interruption when any one of the measured voltages of the plurality of FETs 120 is outside the preset range.

Accordingly, the control unit 300 may control the driving power.

In detail, as shown in FIG. 8, the control unit 300 may cause the interruption exceeding an upper limit when any one of the plurality of FETs 120 has 0.5 V or more, which is the upper limit of the preset range when the preset range is more than 0.3 V and less than 0.5 V.

The control unit 300 may then control the driving power to be decreased because the driving power is sufficient.

On the other hand, the control unit 300 may cause the interruption exceeding a lower limit when the preset range is the same as described above, and any one of the plurality of FETs 120 has 0.3 V or less, which is the lower limit of the preset range.

The control unit 300 may then control the driving power to be increased because the driving power is insufficient.

As set forth above, the lamp system according to the various embodiments of the present disclosure as described above may reduce the heat occurring in the LED to thus increase the efficiency of the lamp.

The lamp system of the present disclosure may thus have the improved safety and the increased convenience.

The lamp system of the present disclosure may reduce heat occurring by deviation in forward voltages of light emitting diodes (LEDs) and increase efficiency to output the maximum light intensity for a certain amount of power.

Although the embodiments of the present disclosure are described as above, the embodiments disclosed in the present disclosure are provided not to limit the spirit of the present disclosure but to fully describe the present disclosure. Therefore, the spirit of the present disclosure may include not only each disclosed embodiment but also a combination of the disclosed embodiments. Further, the scope of the present disclosure is not limited by these embodiments. In addition, it is apparent to those skilled in the art to which the present disclosure pertains that various variations and modifications could be made without departing from the spirit and scope of the appended claims, and all such appropriate variations and modifications should be considered as falling within the scope of the present disclosure as equivalents.

What is claimed is:

1. A lamp system comprising:

a light source driver module configured to provide a driving power;

a light source array module including a light source, among a plurality of light sources, connected in parallel with the driving power;

a switch connected in series with the light source to control an operation of the light source; and a processor configured to:

control the switch;

control the light source driver module to provide the driving power;

control the driving power based on a voltage across at least some of the plurality of light sources;

measure the voltage across the plurality of light sources; and control the driving power by including a predetermined margin value in a maximum value among the measured voltages across the light sources.

2. The system of claim 1, wherein the processor is further configured to:

list up initially-measured voltages across the plurality of light sources in descending order;

select a predetermined number of light sources having a highest voltage across the plurality of light sources, and extract the maximum value of the selected light sources.

3. The system of claim 2, wherein the processor is further configured to monitor each of the voltages across the plurality of light sources at a predetermined period to update the predetermined number of light sources having the highest voltage across the plurality of light sources.

4. The system of claim 2, wherein the processor is further configured to measure the voltage across the plurality of light sources in real time.

5. The system of claim 2, wherein the processor is further configured to periodically monitor the predetermined number of light sources having the highest voltage across the plurality of light sources, and wherein the plurality of light sources comprises light-emitting diodes (LEDs).

6. The system of claim 2, wherein the processor is further configured to control deviations in forward voltages of the LEDs to reduce heat generation and increase efficiency in outputting light intensity of the LEDs.

7. The system of claim 1, wherein the processor is further configured to:

generate a control table for the increase and decrease of the maximum value; and control each driving power to be different for the increase or decrease of a current maximum value compared to a previous maximum value based on the control table.

8. The system of claim 1, wherein the processor is further configured to:

set a first section which is a predetermined voltage section;

maintain the driving power to have a constant value when the maximum value is included in the first section; and apply hysteresis to each section when the maximum value is included in a section before or after the first section to control the driving power to have different predetermined maximum values when a current maximum value is increased or decreased compared to a previous maximum value.

9. The system of claim 1, wherein the processor is further configured to:

monitor a temperature of the light source having the maximum value among the voltages across the plurality of light sources, while predicting a voltage change based on the temperature; and control the driving power based on the voltage change.

10. The system of claim 1, wherein the processor is further configured to:

calculate the voltage across the switch based on the measured voltage across the plurality of light sources, while causing an interruption when any one of the measured plurality of voltages is outside a preset range; and control the driving power based on the interruption.

11. The system of claim 10, wherein the processor is further configured to:

control the driving power to be increased by causing the interruption exceeding a lower limit when any one of the measured plurality of voltages is outside the lower limit of the preset range; and control the driving power to be decreased by causing the interruption exceeding an upper limit when any one of the measured plurality of voltages is outside the upper limit of the preset range.

12. The system of claim 1, wherein the light source array module comprises a light emitting diode (LED) array module (LAM).

13. The system of claim 1, wherein the light source driver module comprises a light emitting diode (LED) driver module (LDM).

14. A processor-implemented method for controlling a lamp system, the method comprising:

providing driving power;

providing a light source, among a plurality of light sources, connected in parallel with the driving power;

providing a switch connected in series with the light source to control the light source;

controlling the switch;

controlling a light source driver module to provide the driving power; and controlling the driving power based on a voltage across at least some of the plurality of light sources;

measuring the voltage across the plurality of light sources; and controlling the driving power by including a predetermined margin value in a maximum value among the measured voltages across the light sources.

15. A lamp system comprising:

a light source array including a plurality of light sources connected in parallel;

a plurality of switches, each connected in series with a respective light source to control current flow through the respective light source;

a driver configured to supply driving power to the light source array;

a processor configured to:

measure forward voltages across a predetermined subset of the plurality of light sources, and dynamically adjust the driving power supplied to the light source array based on the measured forward voltages using a control method comprising hysteresis, wherein the control method applies different adjustment rules depending on whether the maximum measured forward voltage increases or decreases.

* * * * *